US011832323B2

(12) United States Patent
Foti

(10) Patent No.: US 11,832,323 B2
(45) Date of Patent: Nov. 28, 2023

(54) INTERNET PROTOCOL MULTIMEDIA SUBSYSTEM SESSION CONTINUITY IN DUAL REGISTRATION

(71) Applicant: Telefonaktiebolaget LM Ericsson (publ), Stockholm (SE)

(72) Inventor: George Foti, Dollard des Ormeaux (CA)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 216 days.

(21) Appl. No.: 17/044,437

(22) PCT Filed: Apr. 9, 2018

(86) PCT No.: PCT/IB2018/052474
§ 371 (c)(1),
(2) Date: Oct. 1, 2020

(87) PCT Pub. No.: WO2019/197872
PCT Pub. Date: Oct. 17, 2019

(65) Prior Publication Data
US 2021/0037586 A1     Feb. 4, 2021

(51) Int. Cl.
*H04W 76/15*    (2018.01)
*H04W 36/30*    (2009.01)
(Continued)

(52) U.S. Cl.
CPC ......... *H04W 76/15* (2018.02); *H04W 36/305* (2018.08); *H04W 76/19* (2018.02); *H04W 80/10* (2013.01)

(58) Field of Classification Search
None
See application file for complete search history.

(56) References Cited

U.S. PATENT DOCUMENTS 9,401,834 B1 * 7/2016 Jamshidi ............. H04L 65/1016
2012/0021741 A1 * 1/2012 Pancorbo Marcos ......................
                                                        H04M 15/80
                                                        455/433
(Continued)

FOREIGN PATENT DOCUMENTS

WO     2007/149020 A1     12/2007
WO     2009/006012 A2     1/2009

OTHER PUBLICATIONS

International Search Report and Written Opinion dated Dec. 3, 2018 issued in PCT Application No. PCT/IB2018/052474, consisting of 17 pages.
(Continued)

*Primary Examiner* — Alex Skripnikov
*Assistant Examiner* — Pamit Kaur
(74) *Attorney, Agent, or Firm* — SAGE PATENT GROUP

(57) ABSTRACT

Methods and apparatuses related to a P-CSCF server, UE, and PCRF server are disclosed. An indication may be obtained that the UE is at least dual-registered with an IMS via at least a first access network and a second access network. During the ongoing IMS session, an indication associated with the loss of bearer event for a first dedicated bearer for the ongoing IMS session may be received, the first dedicated bearer being associated with the first access network. As a result of at least the indication that the UE is at least dual-registered and receiving the indication associated with the loss of bearer event for the first dedicated bearer, a request is communicated to establish a second dedicated bearer for the second access network to continue the ongoing IMS session with the second access network.

12 Claims, 9 Drawing Sheets

(51) Int. Cl.
 *H04W 76/19* (2018.01)
 *H04W 80/10* (2009.01)

(56) References Cited

U.S. PATENT DOCUMENTS

| | | | | |
|---|---|---|---|---|
| 2013/0010751 | A1* | 1/2013 | Rydnell | H04W 36/14 370/331 |
| 2014/0376511 | A1* | 12/2014 | Kalapatapu | H04W 36/18 370/331 |
| 2015/0181476 | A1* | 6/2015 | Yang | H04W 36/0061 455/454 |
| 2020/0084692 | A1* | 3/2020 | Parron | H04W 28/0226 |
| 2020/0374755 | A1* | 11/2020 | Montenot | H04W 76/12 |

OTHER PUBLICATIONS

3GPP TS 29.214 V15.3.0 (Mar. 2018) 3rd Generation Partnership Project; Technical Specification Group Core Network and Terminals; Policy and Charging Control Over RX Reference Point (Release 15), consisting of 87 pages.

* cited by examiner

INTERNET PROTOCOL MULTIMEDIA SUBSYSTEM SESSION CONTINUITY IN DUAL REGISTRATION

CROSS-REFERENCE TO RELATED APPLICATIONS

This application is a Submission Under 35 U.S.C. § 371 for U.S. National Stage Patent Application of International Application Number: PCT/IB2018/052474, filed Apr. 9, 2018 entitled "INTERNET PROTOCOL MULTIMEDIA SUBSYSTEM SESSION CONTINUITY IN DUAL REGISTRATION," the entirety of which is incorporated herein by reference.

TECHNICAL FIELD

Network communication and in particular, methods and apparatuses for Internet Protocol (IP) Multimedia Subsystem (IMS) session continuity in dual registration.

BACKGROUND

The IP Multimedia Subsystem (hereinafter IMS) enables operators of a Public Land Mobile Network (hereinafter PLMN) to provide their subscribers with multimedia services based and built on Internet applications, services and protocols. Different services and applications can be offered on top of IMS. Internet Protocol (IP) connectivity of a user equipment (UE) terminal to IMS can be through an access network, also referred to as an IP-Connectivity Access Network (IP-CAN).

Before being authorized to make use of IMS services provided by IMS applications, the user has to register into the IMS. Some UEs may support dual registration with the IMS via two different access networks.

When the UE is in a call session, the UE may lose coverage over one access network/IP-CAN. Normally, when the UE loses coverage for an ongoing session there is a change of IP address. When the UE's IP address is changed, the UE typically re-registers with the IMS using the changed IP address. Therefore, the UE discontinues the ongoing session and starts a new session with the new IP address, which means that the ongoing call is disadvantageously discontinued.

SUMMARY

Some embodiments advantageously provide methods and apparatuses for enabling an ongoing IMS session to continue without interruption in the event of loss of coverage for the ongoing session and a change of IP address. In some embodiments, the present disclosure provides for method and apparatuses that may continue the ongoing session without disruption even when the UE has a new IP address for the ongoing IMS session.

According to one aspect of the present disclosure, a Proxy-Call Session Control Function (P-CSCF) server is provided for continuing an ongoing IMS session when the ongoing IMS session experiences a loss of bearer event. The P-CSCF server includes processing circuitry having a processor and a memory, the memory including instructions executable by the processor to configure the P-CSCF server to obtain, from a UE an indication that the UE is at least dual-registered with an IMS via at least a first access network and a second access network. The memory may include further instructions executable by the processor to further configure the P-CSCF server to, during the ongoing IMS session involving the UE, receive an indication associated with the loss of bearer event for a first dedicated bearer for the ongoing IMS session, the first dedicated bearer being associated with the first access network; and, as a result of at least the indication that the UE is at least dual-registered and receiving the indication associated with the loss of bearer event for the first dedicated bearer, communicate a request to establish a second dedicated bearer for the second access network to continue the ongoing IMS session with the second access network.

According to this aspect, in some embodiments, the processing circuitry is further configured to recognize that the indication that the UE is at least dual-registered with an IMS indicates that the UE is registered with the IMS using a first IP address associated with the first access network and that the UE is simultaneously registered with the IMS using a second IP address associated with the second access network, the first IP address being different from the second IP address. In some embodiments of this aspect, the processing circuitry is configured to communicate the request to establish the second dedicated bearer for the second access network by being further configured to, during the ongoing IMS session involving at least the UE and responsive to receiving the indication associated with the loss of bearer event for the first dedicated bearer, communicate, to a Policy and Charging Rules Function (PCRF) server, the request to establish the second dedicated bearer for the second access network to continue the ongoing IMS session with IP connectivity via the second access network. In some embodiments of this aspect, the request to establish the second dedicated bearer for the second access network includes at least a handover indicator, the handover indicator indicating that, during at least a portion of a handover period from the first dedicated bearer to the second dedicated bear associated with the ongoing IMS session, the UE is to be simultaneously associated with at least one Quality of Service (QoS) parameter for the first dedicated bearer associated with the first access network and at least one QoS parameter for the second dedicated bearer associated with the second access network. In some embodiments of this aspect, the indication that the UE is at least dual-registered with the IMS includes a session initiation protocol (SIP) message tag communicated from the UE during an IMS registration procedure. In some embodiments of this aspect, the processing circuitry is configured to receive the indication associated with the loss of bearer event for the first dedicated bearer by being further configured to receive a session initiation protocol (SIP) UPDATE message, or any other appropriate SIP message, from the UE indicating that the UE will lose coverage over the first access network. In some embodiments of this aspect, the SIP UPDATE message includes at least an IP address associated with IMS registration of the UE via the second access network, the IP address being different from an IP address associated with IMS registration of the UE via the first access network. In some embodiments of this aspect, the processing circuitry is further configured to, during the ongoing IMS session and as a result of at least the indication that the UE is at least dual-registered, release resources associated with IP connectivity via the first access network without expecting to receive a session initiation protocol (SIP) BYE message.

According to another aspect of the present disclosure, a first user equipment (UE) is provided for participating in an IMS session with a second UE, the first UE configured to continue the ongoing IMS session when the IMS session experiences a loss of bearer event. The first UE includes processing circuitry having a processor and a memory, the memory including instructions executable by the processor to configure the UE to communicate an indication that the first UE is at least dual-registered with an IMS via at least a first access network and a second access network, and establish the IMS session via the first access network with a first IP address. The UE is further configured to, before an occurrence of the loss of bearer event, communicate, to a P-CSCF server, a SIP UPDATE message including at least a second IP address associated with the second access network.

According to this aspect, in some embodiments, the processing circuitry is further configured to associate a session state of the ongoing IMS session with the second access network. In some embodiments of this aspect, the processing circuitry is further configured to associate the session state of the ongoing IMS session with the second access network by at least creating a transition IMS session state to handle transitioning the session state of the ongoing IMS session from an association with the first access network to an association with the second access network. In some embodiments of this aspect, the processing circuitry is further configured to handle a transition of the session state of the ongoing IMS session from the association with the first access network to the association with the second access network transparently to the second UE. In some embodiments of this aspect, the processing circuitry is further configured to discontinue resources associated with the IMS session via the first access network as a result of a SIP BYE message timing out.

According to yet another aspect of the present disclosure, a Policy and Charging Rules Function (PCRF) server supporting an ongoing IMS session with a UE is provided. The PCRF server includes processing circuitry configured to: receive, from at least one Proxy-Call Session Control Function (P-CSCF) server, a subscription to a loss of bearer event for the IMS session involving the UE; and, after establishing a first dedicated bearer via a first access network for the IMS session, receive, from the at least one P-CSCF server, a request to establish a second dedicated bearer for the ongoing IMS session, the second dedicated bearer associated with a second access network.

According to this aspect, in some embodiments, the processing circuitry is further configured to, responsive to the request to establish the second dedicated bearer for the ongoing IMS session, establish the second dedicated bearer for the ongoing IMS session via the second access network. In some embodiments of this aspect, the received request to establish the second dedicated bearer for the ongoing IMS session includes at least a handover indicator; and the processing circuitry is further configured to, as a result of the handover indicator, during at least a portion of a handover period of the ongoing IMS session from the first access network to the second access network, enable the UE to be simultaneously associated with at least one Quality of Service (QoS) parameter for the first dedicated bearer associated with the first access network and at least one QoS parameter for the second dedicated bearer associated with the second access network.

According to yet another aspect of the present disclosure, a method for a Proxy-Call Session Control Function (P-CSCF) server is provided for continuing an ongoing IMS session when the ongoing IMS session experiences a loss of bearer event. The method includes obtaining, from a UE, an indication that the UE is at least dual-registered with an IMS via at least a first access network and a second access network; during the ongoing IMS session involving the UE, receiving an indication associated with the loss of bearer event for a first dedicated bearer for the ongoing IMS session, the first dedicated bearer being associated with the first access network; and, as a result of at least receiving the indication that the UE is at least dual-registered and as a result of receiving the indication associated with the loss of bearer event for the first dedicated bearer, communicating a request to establish a second dedicated bearer for the second access network to continue the ongoing IMS session with the second access network.

According to this aspect, in some embodiments, the method further includes recognizing that the indication that the UE is at least dual-registered with the IMS indicates that the UE is registered with the IMS using a first IP address associated with the first access network and that the UE is simultaneously registered with the IMS using a second IP address associated with the second access network, the first IP address being different from the second IP address. In some embodiments of this aspect, communicating the request to establish the second dedicated bearer for the second access network further includes, during the ongoing IMS session involving at least the UE and responsive to receiving the indication associated with the loss of bearer event for the first dedicated bearer, communicating, to a PCRF server, the request to establish the second dedicated bearer for the second access network to continue the ongoing IMS session with IP connectivity via the second access network. In some embodiments of this aspect, the request to establish the second dedicated bearer for the second access network includes at least a handover indicator, the handover indicator indicating that, during at least a portion of a handover period from the first dedicated bearer to the second dedicated bear associated with the ongoing IMS session, the UE is to be simultaneously associated with at least QoS parameter for the first dedicated bearer associated with the first access network and at least one QoS parameter for the second dedicated bearer associated with the second access network. In some embodiments of this aspect, the indication that the UE is at least dual-registered with the IMS includes a SIP message tag communicated from the UE during an IMS registration procedure. In some embodiments of this aspect, receiving the indication associated with the loss of bearer event for the first dedicated bearer further includes receiving a SIP UPDATE message from the UE indicating that the UE will lose coverage over the first access network. In some embodiments of this aspect, the SIP UPDATE message includes at least an IP address associated with IMS registration of the UE via the second access network, the IP address being different from an IP address associated with IMS registration of the UE via the first access network. In some embodiments of this aspect, the method further includes, during the ongoing IMS session and as a result of at least the indication that the UE is at least dual-registered, releasing resources associated with IP connectivity via the first access network without expecting to receive a SIP BYE message.

According to another aspect of the present disclosure, a method for a first UE is provided for participating in an ongoing IMS session with a second UE, the first UE being configured to continue the ongoing IMS session when the IMS session experiences a loss of bearer event. The method includes communicating an indication that the first UE is at least dual-registered with an IMS via at least a first access network and a second access network. The method further includes establishing the IMS session via the first access network with a first IP address; and, before an occurrence of the loss of bearer event, communicating, to a P-CSCF server, a SIP UPDATE message including at least a second IP address associated with the second access network.

According to this aspect, in some embodiments, the method further includes associating a session state of the ongoing IMS session with the second access network. In some embodiments of this aspect, associating the session state of the ongoing IMS session with the second access network further includes creating a transition IMS session state to handle transitioning the session state of the ongoing IMS session from an association with the first access network to an association with the second access network. In some embodiments of this aspect, the method further includes handling a transition of the session state of the ongoing IMS session from the association with the first access network to the association with the second access network transparently to the second UE. In some embodiments of this aspect, the method further includes discontinuing resources associated with the IMS session via the first access network as a result of a SIP BYE message timing out.

According to yet another aspect of the present disclosure, a method for a PCRF server supporting an ongoing IMS session with a user equipment. The method includes receiving, from at least one P-CSCF server, a subscription to a loss of bearer event for the IMS session involving the UE, and, after establishing a first dedicated bearer via a first access network for the IMS session, receiving, from the at least one P-CSCF server, a request to establish a second dedicated bearer for the ongoing IMS session, the second dedicated bearer associated with a second access network.

According to this aspect, in some embodiments, the method further includes, responsive to the received request to establish the second dedicated bearer for the ongoing IMS session, establishing the second dedicated bearer for the ongoing IMS session via the second access network. In some embodiments of this aspect, the method further includes receiving the request to establish the second dedicated bearer for the ongoing IMS session as including at least a handover indicator; and, as a result of the handover indicator, during at least a portion of a handover period of the ongoing IMS session from the first access network to the second access network, enabling the UE to be simultaneously associated with at least one QoS parameter for the first dedicated bearer associated with the first access network and at least one QoS parameter for the second dedicated bearer associated with the second access network.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein.

DETAILED DESCRIPTION

Figure 1:
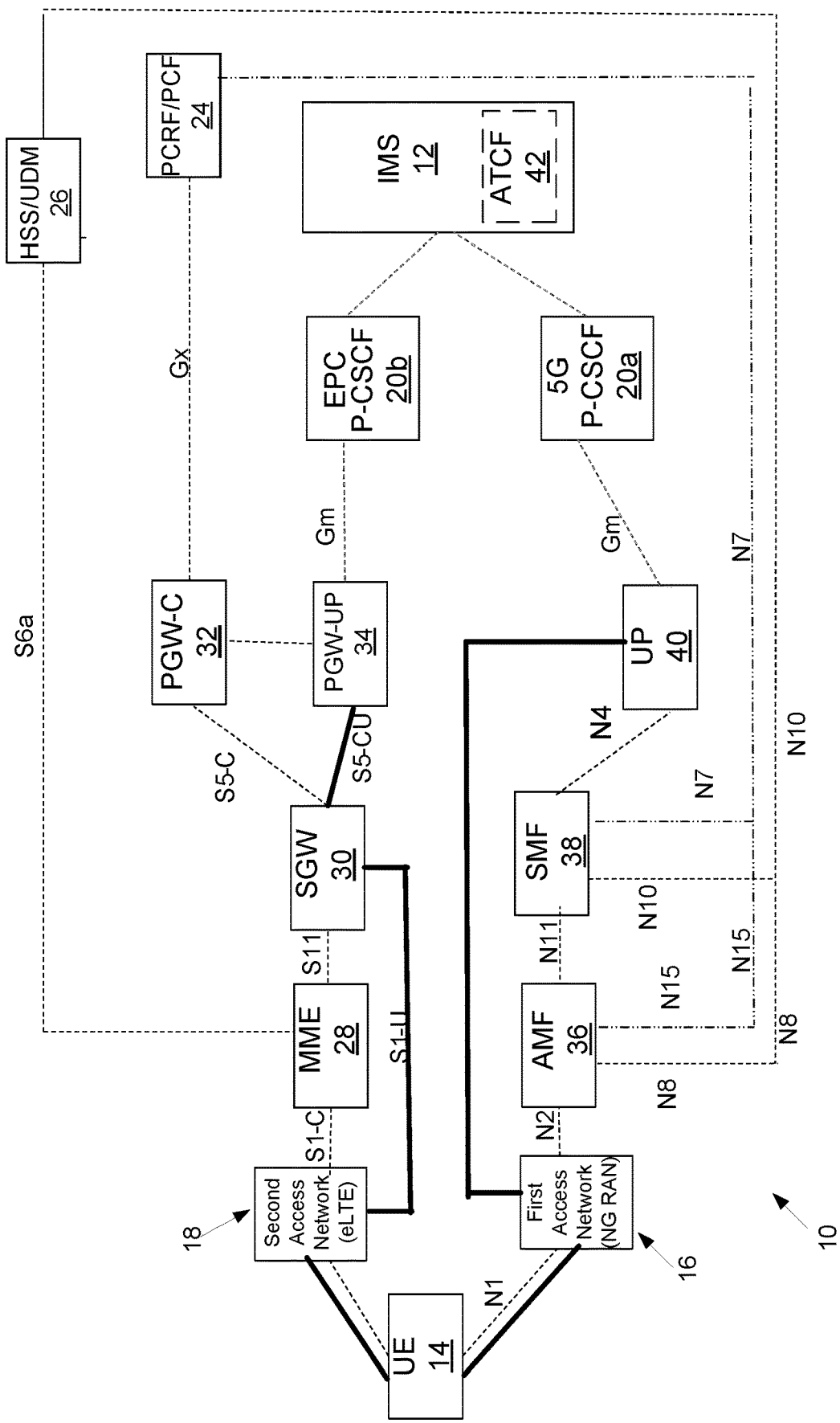
FIG. 1 is a block diagram of an exemplary network architecture according to one embodiment of the present disclosure.

Before describing in detail exemplary embodiments, it is noted that the embodiments reside primarily in combinations of apparatus components and processing steps related to bypass delivery body. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

In some embodiments described herein, the term "coupled," "connected," and the like, may be used herein to indicate a connection, although not necessarily directly, and may include wired and/or wireless connections.

The term "network node" used herein can be any kind of network node comprised in a radio network which may further comprise any of base station (BS), radio base station, base transceiver station (BTS), base station controller (BSC), radio network controller (RNC), g Node B (gNB), evolved Node B (eNB or eNodeB), Node B, multi-standard radio (MSR) radio node such as MSR BS, multi-cell/multicast coordination entity (MCE), relay node, donor node controlling relay, radio access point (AP), transmission points, transmission nodes, Remote Radio Unit (RRU) Remote Radio Head (RRH), a core network node (e.g., mobile management entity (MME), self-organizing network (SON) node, a coordinating node, positioning node, MDT node, etc.), an external node (e.g., 3rd party node, a node external to the current network), nodes in distributed antenna system (DAS), a spectrum access system (SAS) node, an element management system (EMS), etc. The network node may also comprise test equipment. The term "radio node" used herein may be used to also denote a wireless device (WD) such as a wireless device (WD) or a radio network node.

In some embodiments, the non-limiting terms wireless device (WD) or a user equipment (UE) are used interchangeably. The UE herein can be any type of wireless device capable of communicating with a network node or another UE over radio signals, such as wireless device (WD). The UE may also be a radio communication device, target device, device to device (D2D) UE, machine type UE or UE capable of machine to machine communication (M2M), low-cost and/or low-complexity UE, a sensor equipped with UE, Tablet, mobile terminals, smart phone, laptop embedded equipped (LEE), laptop mounted equipment (LME), USB dongles, Customer Premises Equipment (CPE), an Internet of Things (IoT) device, or a Narrowband IoT (NB-IOT) device etc. The UE herein can by any type of communication device capable of communicating with a cloud service provider and/or a network node and/or a server, such as, for example, personal computer (PC), a Tablet, a mobile terminal, via a wired connection and/or a wireless connection. The UE can, in some embodiments, be considered a client terminal, usable by a user to access an IMS, dual-register with the IMS, and communicate in an IMS session via one or more access networks, according to one or more of the techniques described herein.

Also, in some embodiments the generic term "radio network node" is used. It can be any kind of a radio network node which may comprise any of base station, radio base station, base transceiver station, base station controller, network controller, RNC, evolved Node B (eNB), Node B, gNB, Multi-cell/multicast Coordination Entity (MCE), relay node, access point, radio access point, Remote Radio Unit (RRU) Remote Radio Head (RRH).

Note that although terminology from one particular wireless system, such as, for example, 3GPP LTE, may be used in this disclosure, this should not be seen as limiting the scope of the disclosure to only the aforementioned system. The arrangements discussed herein may also be applied to 5G/New Radio (NR), and other technologies. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from exploiting the ideas covered within this disclosure.

In some embodiments, the phrase "at least dual-registered" means that the UE is simultaneously registered with IMS over at least two different access networks. In particular, it is contemplated that in some embodiments, simultaneous registration may occur over more than two different access networks.

In some embodiments, a SIP message tag can be any identifier associated with a SIP message to indicate that the UE is at least dual-registered. In some embodiments, the SIP message tag can be a text-based identifier including any combination of letters, numbers, symbols, etc. that can be used to indicate that the UE is at least dual-registered with IMS.

In some embodiments, information, such as, for example, an indication of a loss of bearer event and/or an IP address may be included in a SIP UPDATE message, or any other appropriate SIP message.

Note further, that functions described herein as being performed by a UE or a P-CSCF or a PCFR may be distributed over a plurality of UEs and/or a plurality of P-CSCFs and/or a plurality of PCRFs. In other words, it is contemplated that the functions of the P-CSCF and PCRF and UE described herein are not limited to performance by a single physical device and, in fact, can be distributed among several physical devices.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

In some embodiments, the methods and apparatuses described in the present disclosure may advantageously provide optimized session continuity at the IMS level for UEs that support dual registration, even if the IP address of the UE has changed during the IMS session due to the loss of coverage for the UE in an access network. In some embodiments, the methods and apparatuses described in the present disclosure may advantageously be configured to use the changed IP address of the UE to continue an ongoing IMS session, rather than disconnecting the ongoing call to switch access networks due to a loss of bearer event.

In some embodiments, the UE, prior to loosing coverage, may update the P-CSCF and the Access Transfer Control Function (ATCF) associated with the current access where the IMS session has been established, with the new IP address associated with the second access, and that the UE already acquired. This may enable the UE to keep the session going when coverage is lost over the current access network. The P-CSCF associated with each access used during IMS registration by the UE may be the same, in some embodiments, or different, in other embodiments. In some embodiments, once the ATCF acquires the new IP address, then the session can continue seamlessly, without interruption. Furthermore, in some embodiments, the remote UE (on the other end of the IMS session) may be unaware that there was even a loss of coverage at the UE.

In some embodiments, a new feature tag may be used by the UE to indicate to the IMS that the UE supports dual Radio and simultaneous IMS registration. This new feature tag may be included at IMS registration by the UE from both access networks. Such feature tag may be known by the P-CSCF and all IMS entities involved in IMS registration, and its usage may also be used later at session tear down. In addition, this feature tag may enable the P-CSCF to deploy an ATCF in the IMS session.

For tearing down the ongoing session that was continued according to embodiments of the present disclosure, and where different P-CSCFs are used to continue the session, the UE may no longer be connected to the initial/previous P-CSCF. Thus, in such embodiments, the SIP BYE Request from the UE will be lost. For the UE, if the SIP BYE request times-out, the UE will clear the session anyway. Thus, tear down may not be an issue for the UE. That said, to enable the previous P-CSCF to clear its resources for the session, in some embodiments, once the UE terminates a session, the P-CSCF will subscribe with the PCRF to the loss of bearer event. Once the UE clears the session, PCFR may notify P-CSCF of the loss of bearer event, which can prompt the P-CSCF to clear its resources for the session. Similar to the UE scenario, when the previous P-CSCF tears down the session, the request times-out and the P-CSCF clears its resources. The P-CSCF can use its knowledge that the UE supports dual registration, through the new feature tag, to not expect a normal SIP BYE request for session tear down.

Referring now to the drawings, in which like reference designators refer to like elements, there is shown in FIG. 1, an exemplary system, and its related components, constructed in accordance with the principles of the present disclosure and designated generally as "10." Referring to FIG. 1, system 10 may include an IMS 12 and at least one UE 14, in addition to various support elements for supporting IMS communications, such as, a first access network 16 and a second access network 18. The UE 14 may be capable of accessing both the first access network 16 and the second access network 18 and may have corresponding communication interfaces for each type of access.

The system 10 may further include at least a first P-CSCF 20a and a second P-CSCF 20b providing proxy communications between the UE 14 and the IMS 12 via the first access network 16 and the second access network 18, respectively. The access network 16 and 18 may be considered an IP-Connectivity Access Network (hereinafter IP-CAN or access network). An exemplary access network may be 4G, 5G, New Radio (NR), etc. The system 10 may also include a Policy and Charging Rules Function/Policy Control Function (PCRF/PCF) server 24 (hereinafter PCRF server) and a Home Subscriber Server/User Data Management (HSS/UDM) server 26 (hereinafter HSS server). In some embodiments, the PCRF server 24 may be interposed between the signalling and the bearer layers and responsible for triggering the installation of QoS-related rules towards a Policing and Charging Enforcement Function (PCEF, not shown) located in the traffic plane. In some embodiments, the HSS 26 may be a database of subscriber information allowing users to be granted access to the IMS associated with the subscriber's specific information.

For exemplary purposes, the first access network 16 is shown in FIG. 1 as a Next Generation Radio Access Network (NG RAN or 5G) and the second access network 18 is shown as an enhanced-Long Term Evolution (eLTE or 4G) access network. However, in other embodiments, there may be additional access networks and/or different access networks used by the UE 14 to obtain IP connectivity to the IMS 12. In other words, implementations are not limited to 4G and 5G networks. The first access network 16 and the second access network 18 may each include a radio node, such as a base station (e.g., eNodeB, gNB), for facilitating radio communications over the respective access network 16 and 18. Additional radio network support entities may be associated with the access networks 16, 18. For example, a mobile management entity (MME) 28, a serving gateway (SGW) 30, a Packet Data Network Gateway—Control (PGW-C) 32, and a Packet Data Network Gateway—User Plane (PGW-UP) 34 may be coupled to the second access network 18; and an Access and Mobility Function (AMF) 36, Session Management Function (SMF) 38, and a User Plane Function (UPF) 40 may be coupled to the first access network 16, according to known connections and interfaces for such radio access networks, which are well-known and therefore will not be discussed in detail herein.

In addition, an Access Transfer Control Function (ATCF) 42 may be included in the IMS 12 to assist with transparent IMS session transfer to the remote UE. In some embodiments, the ATCF 42 may act as a Session Initiation Protocol (SIP) signaling anchor and may be located in the SIP signaling path between a P-CSCF and another IMS entity, namely, a Serving-Call Session Control Function (S-CSCF) (not shown). The ATCF may be co-located with the P-CSCF or may be part of a session boarder controller (SBC) associated with the IMS 12.

Figure 2:
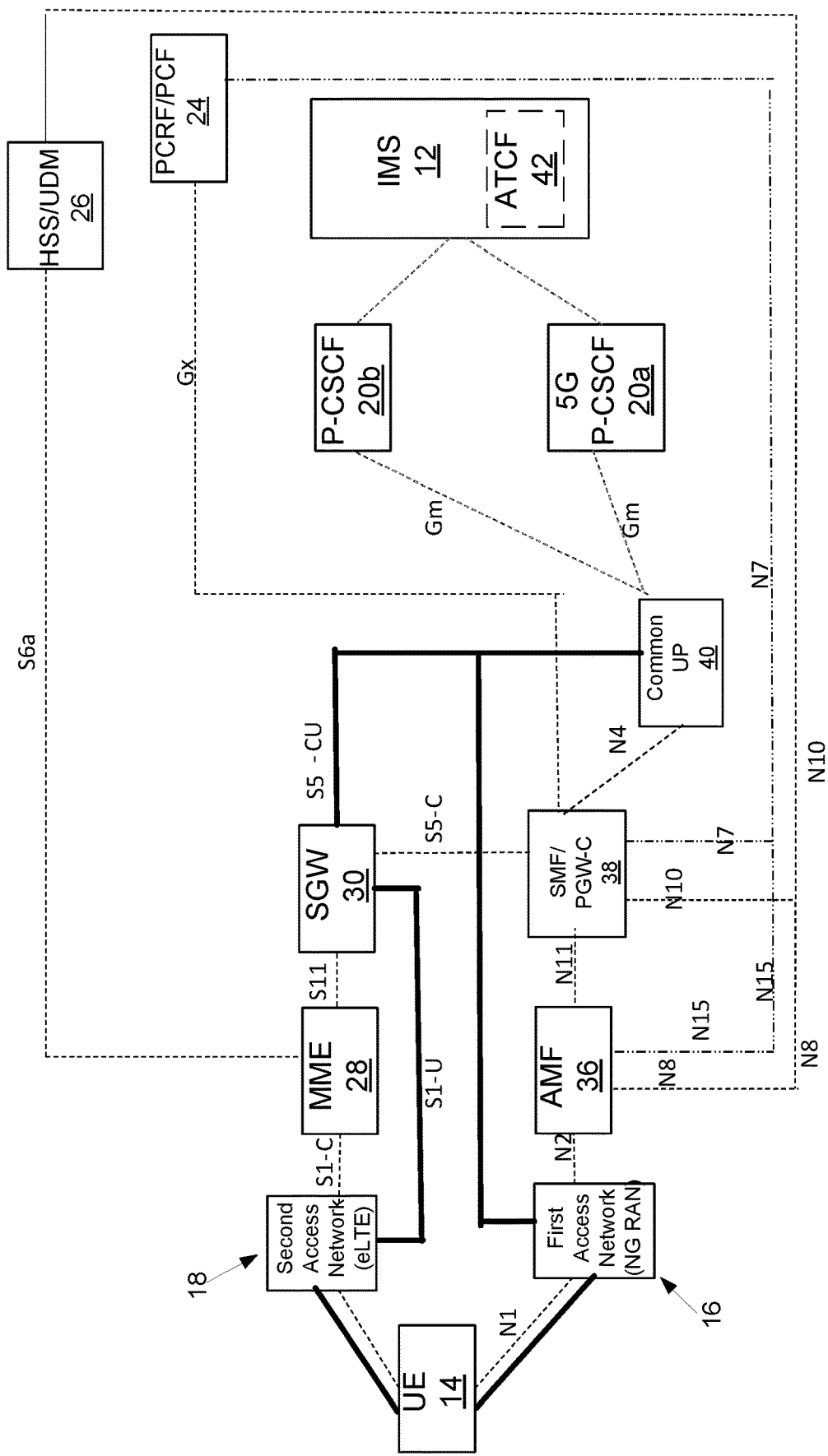
FIG. 2 is a block diagram an another exemplary network architecture according to another embodiment of the present disclosure.

FIG. 2 illustrates another exemplary system 10 that may be used to implement embodiments of the present disclosure. The system 10 depicted in FIG. 2 is identical to the system 10 shown in FIG. 1, except that a Common User Plane Function (Common UPF) is interposed between each of the P-CSCFs 20a, 20b and their respective access networks 16, 18. Furthermore, there is a common SMF 32/PGW-C 38 controlling the common UP 40.

Before being authorized to make use of IMS services provided by IMS applications, the UE 14 may register with the IMS 12. One exemplary process for the UE 14 registering with IMS 12 may proceed as follows. The UE 14 may determine which P-CSCF server 20a, 20b the UE 14 shall use for registration. The UE 14 may then send a Register message to the determined P-CSCF server 20a, 20b. The UE 14 may use a Domain Name System (DNS) query to resolve a P-CSCF server host name into an IP address and Transport protocol (e.g., User Datagram Protocol (UDP)). The Register message may include registration data. This registration data may include, for example, a public identifier, a Home realm and a contact address associated with the UE 14. In some embodiments, the Register message may include a tag or any other indicator indicating that the UE 14 is at least dual-registered over at least two different access networks in IMS 12. During registration, the P-CSCF server 20a, 20b may select an inbound proxy, based on the Home realm, and then forwards the Register message to the selected inbound proxy, such as an Interrogating-Call Session Control Function (I-CSCF) server (not shown) within the IMS 12. The I-CSCF server may query the HSS 26, based on the public identifier, and may ask for information regarding the Serving-Call Session Control Function (S-CSCF) server (not shown) that should be allocated for this UE 14. The I-CSCF server may then forward the Register message to the selected S-CSCF server. The I-CSCF and S-CSCF may be considered part of the IMS 12. The selected S-CSCF server may inform the HSS 26 that this subscriber UE 14 has registered and that this S-CSCF (the selected S-CSCF) has been assigned to that UE 14. The HSS 26 stores the S-CSCF address for this UE 14, so subsequent registration or session establishment may be directed to this S-CSCF server. The HSS 26 may supply the subscription profile to the S-CSCF server, which the S-CSCF server stores. The S-CSCF server may also store the contact address of the UE 14 and the host name of the P-CSCF server 20a, 20b. This enables the S-CSCF server to contact this UE 14 for session establishment, sending the message through the allocated P-CSCF server 20a, 20b for the UE 14. Successful registration is reported towards the UE 14 in a 200 Ok SIP message. The 200 Ok message contains a subset of subscription information, to be stored in the P-CSCF server 20a, 20b. The 200 Ok message may also include the host name of the S-CSCF server. The 200 Ok message may follow the reverse path of the Register message. For example, the I-CSCF forwards the 200 Ok message to the P-CSCF server 20a, 20b. The P-CSCF server 20a, 20b then stores the received subscription data and forwards the 200 Ok message on to the UE 14. The UE 14 may store the received subscription data as well as the host name of the S-CSCF server allocated to the subscriber associated with the UE 14. The UE 14 may now be considered to be in a state that it is able to initiate and answer multimedia communication sessions.

Having generally described one exemplary registration process that may be performed in the system 10 illustrated in FIGS. 1 and 2, some embodiments of the present disclosure will now be described for allowing a UE 14 that is at least dual-registered with IMS 12 over at least two access networks to continue an ongoing session when there is a loss of coverage in one of the access networks by, for example, using a new registration indicator to facilitate a new session continuity process.

When the UE 14 is in a call session, the UE 14 may lose coverage over the access network/IP-CAN 16, 18. Normally, when the UE 14 loses coverage for an ongoing session there is a change of IP address associated with the UE 14. When the UE's 14 IP address is changed, the UE 14 typically must re-register with the IMS 12, which includes the UE 14 discontinuing the ongoing session, and starting a new IMS session with the new IP address. FIGS. 3-9 illustrate methods and apparatuses for advantageously continuing an ongoing IMS session when the UE 14 loses coverage without discontinuing the session.

Figure 3:
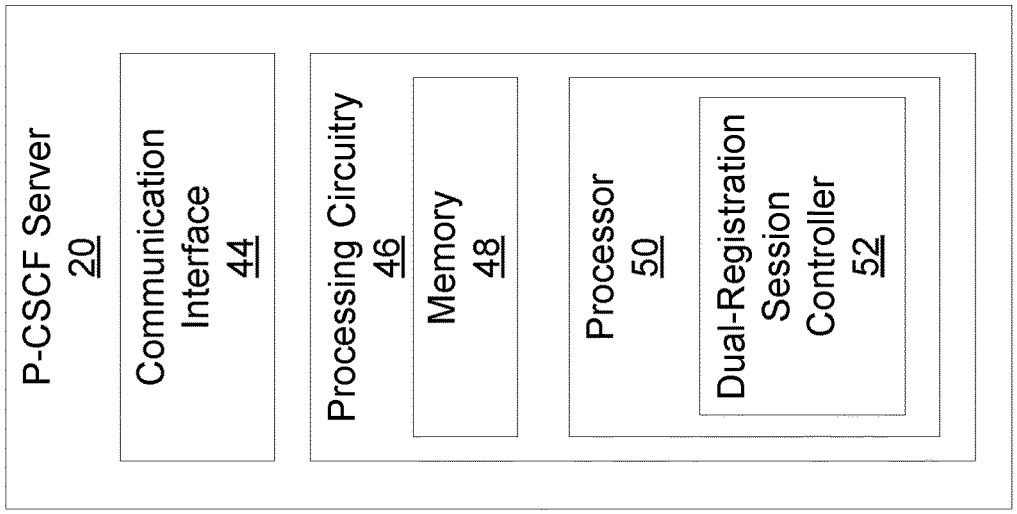
FIG. 3 is a block diagram of an exemplary P-CSCF server according to one embodiment of the present disclosure.

As shown in FIG. 3, in one embodiment, a P-CSCF server 20 (e.g., 20a and/or 20b) includes a communication interface 44, processing circuitry 46, and memory 48. The communication interface 44 may be configured to communicate with the UE 14 and/or other elements in the system 10 to facilitate UE 14 access to the IMS 12. In some embodiments, the communication interface 44 may be formed as or may include, for example, one or more radio frequency (RF) transmitters, one or more RF receivers, and/or one or more RF transceivers, and/or may be considered a radio interface. In some embodiments, the communication interface 44 may also include a wired interface.

The processing circuitry 46 may include one or more processors 50 and memory, such as, the memory 48. In particular, in addition to a traditional processor and memory, the processing circuitry 46 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 50 may be configured to access (e.g., write to and/or read from) the memory 48, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the P-CSCF server 20 may further include software stored internally in, for example, memory 48, or stored in external memory (e.g., database) accessible by the P-CSCF server 20 via an external connection. The software may be executable by the processing circuitry 46. The processing circuitry 46 may be configured to control any of the methods and/or processes described herein and/or to cause such methods, and/or processes to be performed, e.g., by the P-CSCF server 20. The memory 48 is configured to store data, programmatic software code and/or other information described herein. In some embodiments, the software may include instructions that, when executed by the processor 50 and/or Dual-registration Session Controller 52, causes the processor 50 and/or Dual-registration Session Controller 52 to perform the processes described herein with respect to the P-CSCF server 20.

For example, the memory 48 may store instructions executable by the processor 50 and/or the Dual-registration session controller 52 to configure the P-CSCF server 20 to obtain, from the UE 14, an indication that the UE 14 is at least dual-registered with the IMS via at least a first access network 16 and a second access network 18; during the ongoing IMS session involving the UE 14, receive an indication associated with the loss of bearer event for a first dedicated bearer for the ongoing IMS session, the first dedicated bearer being associated with the first access network 16; and, as a result of at least the indication that the UE 14 is at least dual-registered and receiving the indication associated with the loss of bearer event for the first dedicated bearer, communicate a request to establish a second dedicated bearer for the second access network 18 to continue the ongoing IMS session with the second access network 18. In some embodiments, the processing circuitry 46 may be further configured to recognize that the indication that the UE 14 is at least dual-registered with the IMS 12 indicates that the UE 14 is registered with the IMS 12 using a first IP address associated with the first access network 16 and that the UE 14 is simultaneously registered with the IMS 12 using a second IP address associated with the second access network 18, the first IP address being different from the second IP address.

In some embodiments, the processing circuitry 46 may be further configured to communicate the request to establish the dedicated bearer for the second access network 18 by being further configured to, during the ongoing IMS session involving at least the UE 14 and responsive to receiving the indication associated with the loss of bearer event for the first dedicated bearer, communicate, to a PCRF server 24, the request to establish the second dedicated bearer for the second access network 18 to continue the ongoing IMS session with IP connectivity via the second access network 18. In some embodiments, the request to establish the second dedicated bearer for the second access network 18 may include at least a handover indicator, the handover indicator indicating that, during at least a portion of a handover period from the first dedicated bearer to the second dedicated bear associated with the ongoing IMS session, the UE 14 is to be simultaneously associated with at least one QoS parameter for the first dedicated bearer associated with the first access network 16 and at least one QoS parameter for the second dedicated bearer associated with the second access network 18. In some embodiments, the indication that the UE 14 is at least dual-registered with the IMS 12 includes a SIP message tag communicated from the UE 14 during an IMS registration procedure. In some embodiments, the processing circuitry 46 is configured to receive the indication associated with the loss of bearer event for the first dedicated bearer by being further configured to receive a SIP update message from the UE 14 indicating that the UE 14 will lose coverage over the first access network 16.

In some embodiments, the SIP UPDATE message includes at least an IP address associated with IMS registration of the UE 14 via the second access network 18, the IP address being different from an IP address associated with IMS registration of the UE 14 via the first access network 16. In some embodiments, the processing circuitry 46 is further configured to, during the ongoing IMS session and as a result of at least the indication that the UE 14 is at least dual-registered, release resources associated with IP connectivity via the first access network 16 without expecting to receive a SIP BYE message.

Figure 4:
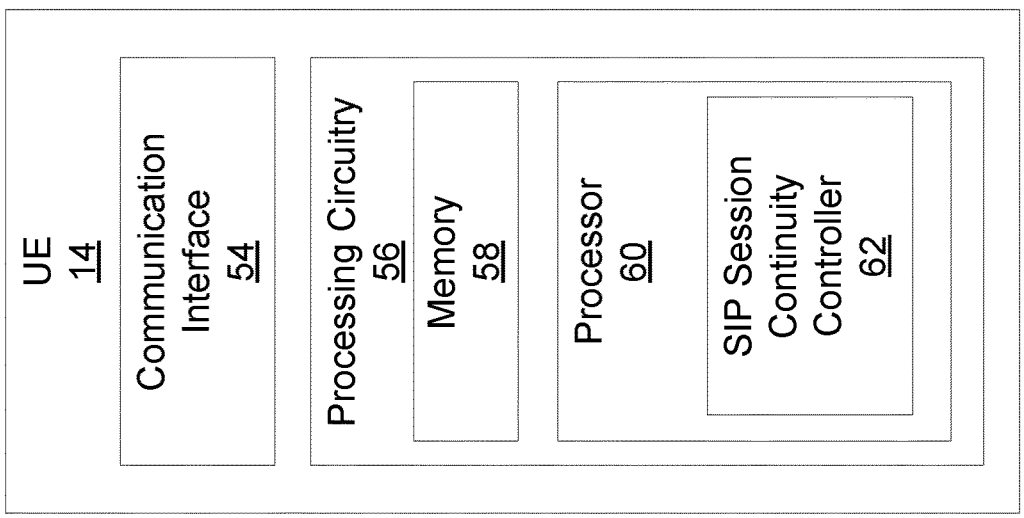
FIG. 4 is a block diagram of an exemplary UE according to one embodiment of the present disclosure.

As shown in FIG. 4, in one embodiment, the UE 14 includes a communication interface 54, processing circuitry 56, and memory 58. The communication interface 54 may be configured to communicate with the P-CSCF server 20 and/or other elements in the system 10 to facilitate UE 14 access to the IMS 12. In some embodiments, the communication interface 54 may be formed as or may include, for example, one or more radio frequency (RF) transmitters, one or more RF receivers, and/or one or more RF transceivers, and/or may be considered a radio interface. In some embodiments, the communication interface 54 may also include a wired interface.

The processing circuitry 56 may include one or more processors 50 and memory, such as, the memory 58. In particular, in addition to a traditional processor and memory, the processing circuitry 56 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 50 may be configured to access (e.g., write to and/or read from) the memory 58, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the UE 14 may further include software stored internally in, for example, memory 58, or stored in external memory (e.g., database) accessible by the UE 14 via an external connection. The software may be executable by the processing circuitry 56. The processing circuitry 56 may be configured to control any of the methods and/or processes described herein and/or to cause such methods, and/or processes to be performed, e.g., by the UE 14. The memory 58 is configured to store data, programmatic software code and/or other information described herein. In some embodiments, the software may include instructions that, when executed by the processor 60 and/or SIP Session Continuity Controller 62, causes the processor 60 and/or SIP Session Continuity Controller 62 to perform the processes described herein with respect to the UE 14.

For example, the UE 14 may be considered a first UE 14 including the processing circuitry 56 having a processor 60 and a memory 58, the memory 58 including instructions executable by the processor 60 to configure the UE 14 to communicate an indication that the first UE 14 is at least dual-registered with the IMS 12 via at least a first access network 16 and a second access network 18; establish the IMS session via the first access network 16 with a first IP address; and, before an occurrence of the loss of bearer event, communicate, to a P-CSCF server 20, a SIP UPDATE message including at least a second IP address associated with the second access network 18. In some embodiments, the processing circuitry 56 is further configured to associate a session state of the ongoing IMS session with the second access network 18. In some embodiments, the processing circuitry 56 is further configured to associate the session state of the ongoing IMS session with the second access network 18 by at least creating a transition IMS session state to handle transitioning the session state of the ongoing IMS session from an association with the first access network 16 to an association with the second access network 18. In some embodiments, the processing circuitry 56 is further configured to handle a transition of the session state of the ongoing IMS session from the association with the first access network 16 to the association with the second access network 18 transparently to the second UE 14b. In some embodiments, the processing circuitry 56 is further configured to discontinue resources associated with the IMS session via the first access network 16 as a result of a SIP BYE message timing out.

Figure 5:
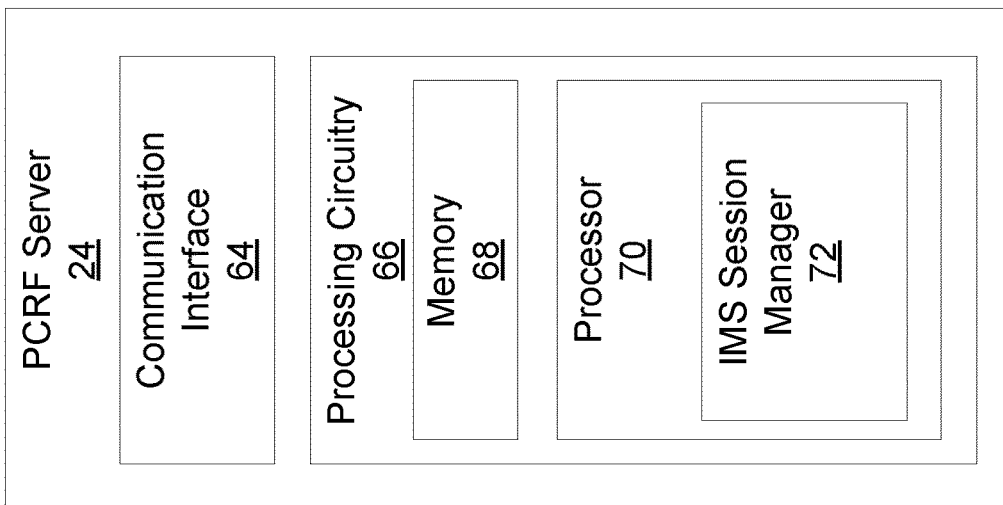
FIG. 5 is an exemplary PCRF server according to one embodiment of the present disclosure.

As shown in FIG. 5, in one embodiment, the PCRF server 24 includes a communication interface 64, processing circuitry 66, and memory 68. The communication interface 64 may be configured to communicate with elements in the system 10 to facilitate UE 14 access to the IMS 12. In some embodiments, the communication interface 64 may be formed as or may include, for example, one or more radio frequency (RF) transmitters, one or more RF receivers, and/or one or more RF transceivers, and/or may be considered a radio interface. In some embodiments, the communication interface 64 may also include a wired interface.

The processing circuitry 66 may include one or more processors 70 and memory, such as, the memory 68. In particular, in addition to a traditional processor and memory, the processing circuitry 66 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 70 may be configured to access (e.g., write to and/or read from) the memory 68, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the PCRF server 24 may further include software stored internally in, for example, memory 68, or stored in external memory (e.g., database) accessible by the PCRF server 24 via an external connection. The software may be executable by the processing circuitry 66. The processing circuitry 66 may be configured to control any of the methods and/or processes described herein and/or to cause such methods, and/or processes to be performed, e.g., by the PCRF server 24. The memory 68 is configured to store data, programmatic software code and/or other information described herein. In some embodiments, the software may include instructions that, when executed by the processor 70 and/or IMS Session Manager 72, causes the processor 70 and/or IMS Session Manager 72 to perform the processes described herein with respect to the PCRF server 24.

For example, the PCRF server 24 may include the processing circuitry 66 configured to receive, from at least one P-CSCF server 20, a subscription to a loss of bearer event for the IMS session involving a UE 14; and, after establishing a first dedicated bearer via a first access network 16 for the IMS session, receive, from the at least one P-CSCF server 20, a request to establish a second dedicated bearer for the ongoing IMS session, the second dedicated bearer associated with a second access network 18. In some embodiments, the processing circuitry 66 is further configured to, responsive to the request to establish the second dedicated bearer for the ongoing IMS session, establish the second dedicated bearer for the ongoing IMS session via the second access network 18. In some embodiments, the received request to establish the second dedicated bearer for the ongoing IMS session includes at least a handover indicator; and the processing circuitry 66 is further configured to, as a result of the handover indicator, during at least a portion of a handover period of the ongoing IMS session from the first access network 16 to the second access network 18, enable the UE 14 to be simultaneously associated with at least one QoS parameter for the first dedicated bearer associated with the first access network 16 and at least one QoS parameter for the second dedicated bearer associated with the second access network 18.

Figure 6:
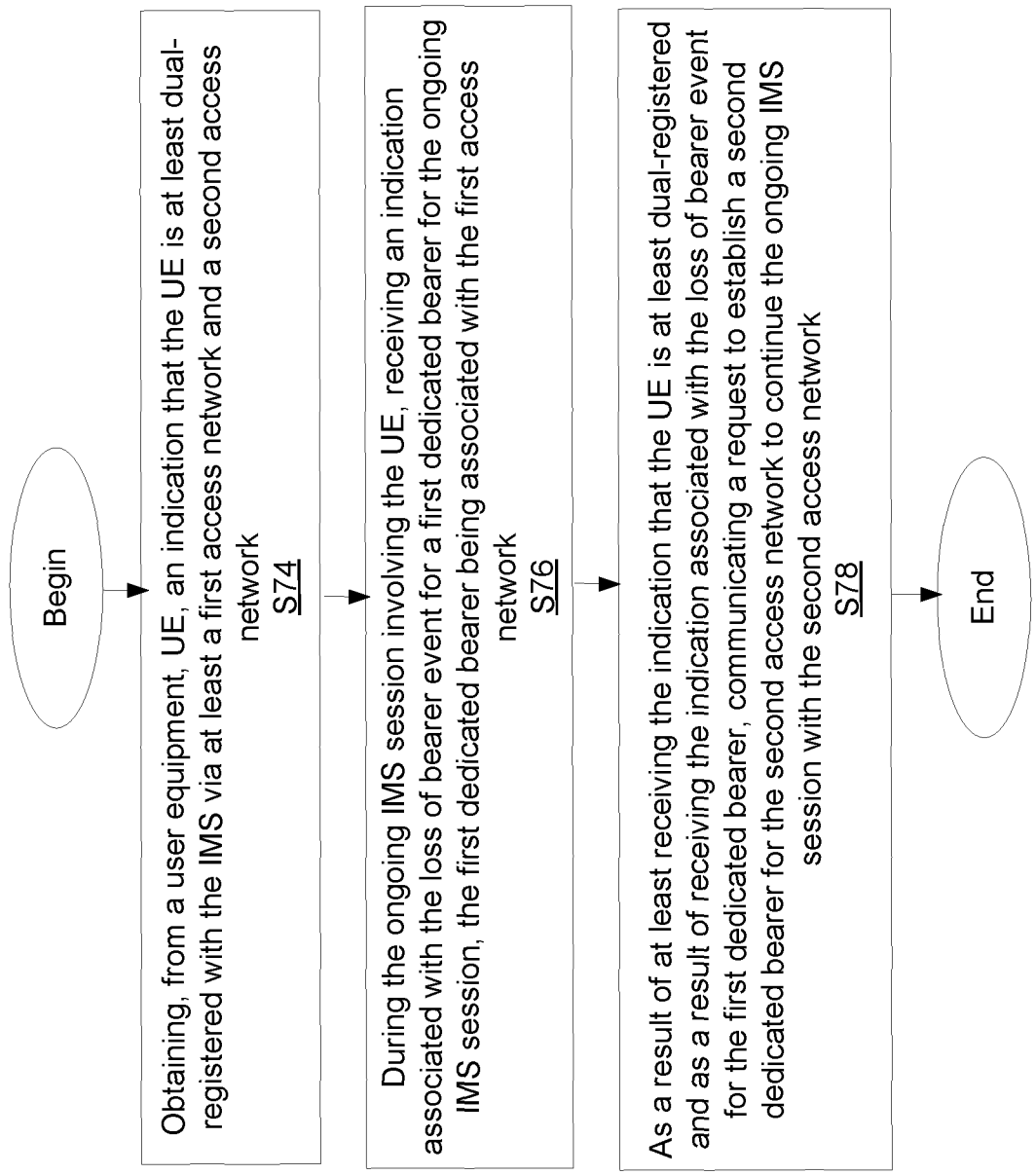
FIG. 6 is a flow chart illustrating an exemplary method implemented in a P-CSCF server according to one embodiment of the present disclosure.

FIG. 6 is a flowchart illustrating an exemplary method that may be implemented in a P-CSCF server, such as, for example, the P-CSCF server 20 for continuing an ongoing IMS session when the ongoing IMS session experiences a loss of bearer event. The exemplary method includes obtaining, from a UE 14, an indication that the UE 14 is at least dual-registered with the IMS 12 via at least a first access network 16 and a second access network 18 (block S74). The method including, during the ongoing IMS session involving the UE 14, receiving an indication associated with the loss of bearer event for a first dedicated bearer for the ongoing IMS session, the first dedicated bearer being associated with the first access network 16 (block S76). As a result of at least receiving the indication that the UE 14 is at least dual-registered and as a result of receiving the indication associated with the loss of bearer event for the first dedicated bearer, a request is communicated to establish a second dedicated bearer for the second access network 18 to continue the ongoing IMS session with the second access network 18 (block S78).

In some embodiments, the method further includes recognizing that the indication that the UE 14 is at least dual-registered with the IMS 12 indicates that the UE 14 is registered with the IMS 12 using a first IP address associated with the first access network 16 and that the UE 14 is simultaneously registered with the IMS 12 using a second IP address associated with the second access network 18, the first IP address being different from the second IP address. In some embodiments, communicating the request to establish the second dedicated bearer for the second access network 18 further includes, during the ongoing IMS session involving at least the UE 14 and responsive to receiving the indication associated with the loss of bearer event for the first dedicated bearer, communicating, to a PCRF server 24, the request to establish the second dedicated bearer for the second access network 18 to continue the ongoing IMS session with IP connectivity via the second access network 18.

In some embodiments, the request to establish the second dedicated bearer for the second access network 18 includes at least a handover indicator, the handover indicator indicating that, during at least a portion of a handover period from the first dedicated bearer to the second dedicated bear associated with the ongoing IMS session, the UE 14 is to be simultaneously associated with at least one QoS parameter for the first dedicated bearer associated with the first access network 16 and at least one QoS parameter for the second dedicated bearer associated with the second access network 18. In some embodiments, the indication that the UE 14 is at least dual-registered with the IMS 12 includes a SIP message tag communicated from the UE 14 during an IMS registration procedure. In some embodiments, receiving the indication associated with the loss of bearer event for the first dedicated bearer further comprises receiving a SIP UPDATE message from the UE 14 indicating that the UE 14 will lose coverage over the first access network 16.

In some embodiments, the SIP UPDATE message includes at least an IP address associated with IMS registration of the UE 14 via the second access network 18, the IP address being different from an IP address associated with IMS registration of the UE 14 via the first access network 16. In some embodiments, the method further includes, during the ongoing IMS session and as a result of at least the indication that the UE 14 is at least dual-registered, releasing resources associated with IP connectivity via the first access network 16 without expecting to receive a SIP BYE message.

Figure 7:
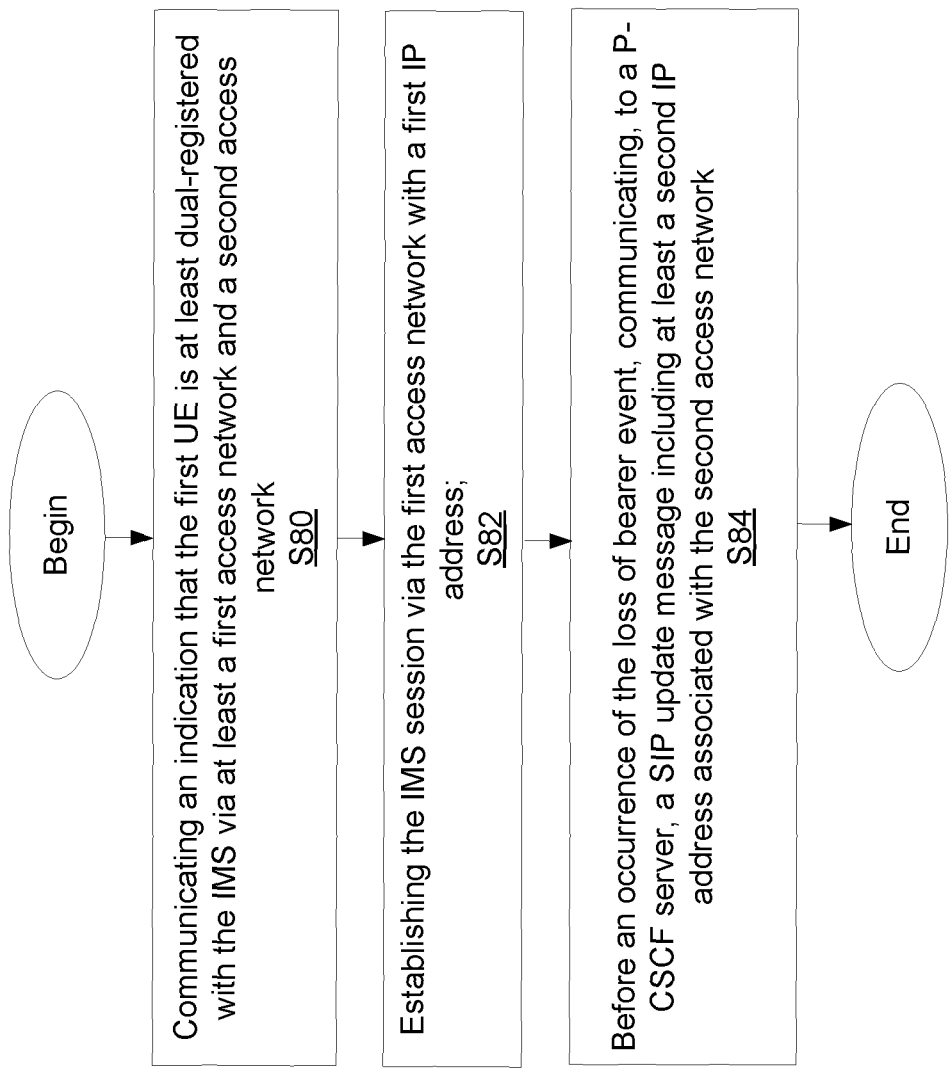
FIG. 7 is a flow chart illustrating an exemplary method implemented in a UE according to one embodiment of the present disclosure.

FIG. 7 is a flowchart illustrating an exemplary method that may be implemented in a UE, such as, for example, the UE 14a for participating in an ongoing IMS session with a second UE 14b, the first UE 14a configured to continue the ongoing IMS session when the IMS session experiences a loss of bearer event. The exemplary method includes communicating an indication that the first UE 14a is at least dual-registered with the IMS 12 via at least a first access network 16 and a second access network 18 (block S80). The IMS session is established via the first access network 16 with a first IP address (block S82). The method further includes, before an occurrence of the loss of bearer event, communicating, to a P-CSCF server 20, a SIP UPDATE message including at least a second IP address associated with the second access network 18 (block S84).

In some embodiments, the method further includes associating a session state of the ongoing IMS session with the second access network 18. In some embodiments, associating the session state of the ongoing IMS session with the second access network 18 further includes creating a transition IMS session state to handle transitioning the session state of the ongoing IMS session from an association with the first access network 16 to an association with the second access network 18. In some embodiments, the method further includes handling a transition of the session state of the ongoing IMS session from the association with the first access network 16 to the association with the second access network 18 transparently to the second UE 14b. In some embodiments, the method further includes discontinuing resources associated with the IMS session via the first access network 16 as a result of a SIP BYE message timing out.

Figure 8:
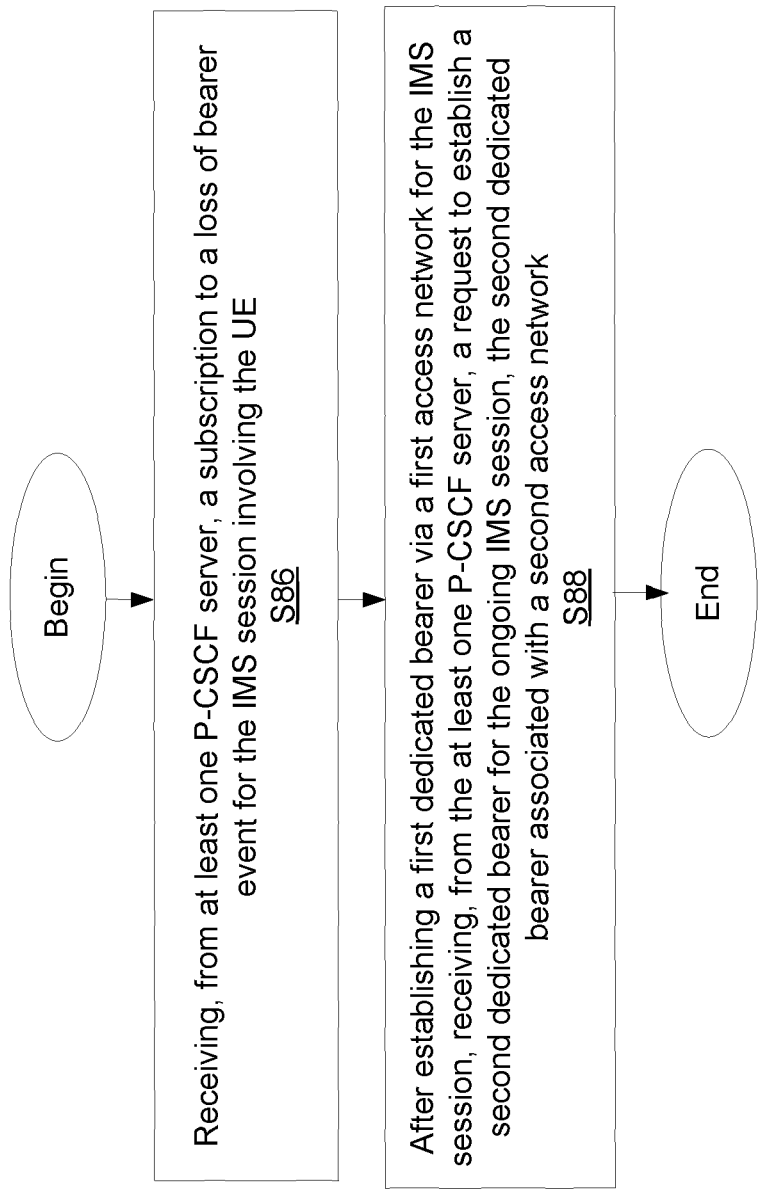
FIG. 8 is a flow chart illustrating an exemplary implemented in a PCRF server according to one embodiment of the present disclosure.

FIG. 8 is a flowchart illustrating an exemplary method that may be implemented in a PCRF server, such as, for example, the PCRF server 24 for supporting an ongoing IMS session with a UE. The exemplary method includes receiving, from at least one P-CSCF server 20, a subscription to a loss of bearer event for the IMS session involving the UE 14 (block S86); and, after establishing a first dedicated bearer via a first access network 16 for the IMS session, receiving, from the at least one P-CSCF server 20, a request to establish a second dedicated bearer for the ongoing IMS session, the second dedicated bearer associated with a second access network 18 (block S88). In some embodiments, the method further includes, responsive to the received request to establish the second dedicated bearer for the ongoing IMS session, establishing the second dedicated bearer for the ongoing IMS session via the second access network 18. In some embodiments, the method further includes receiving the request to establish the second dedicated bearer for the ongoing IMS session as including at least a handover indicator; and, as a result of the handover indicator, during at least a portion of a handover period of the ongoing IMS session from the first access network 16 to the second access network 18, enabling the UE 14 to be simultaneously associated with at least one QoS parameter for the first dedicated bearer associated with the first access network 16 and at least one QoS parameter for the second dedicated bearer associated with the second access network 18.

Having generally described some embodiments of the present disclosure, a more detailed description of some embodiments of the present disclosure will now be described with reference to the flow diagram of FIGS. 9a-9c.

Some such embodiments of the present disclosure provide techniques for supporting session continuity for a UE 14 that supports dual (simultaneous) registration with the IMS 12, without clearing the ongoing call. In some embodiments, the present disclosure may advantageously provide for optimized session continuity at the IMS level for a UE 14 that supports dual registration, even if the IP address of the UE 14 has changed during the IMS session due to a loss of coverage for the UE 14 in the current access network 16.

Figure 9A:
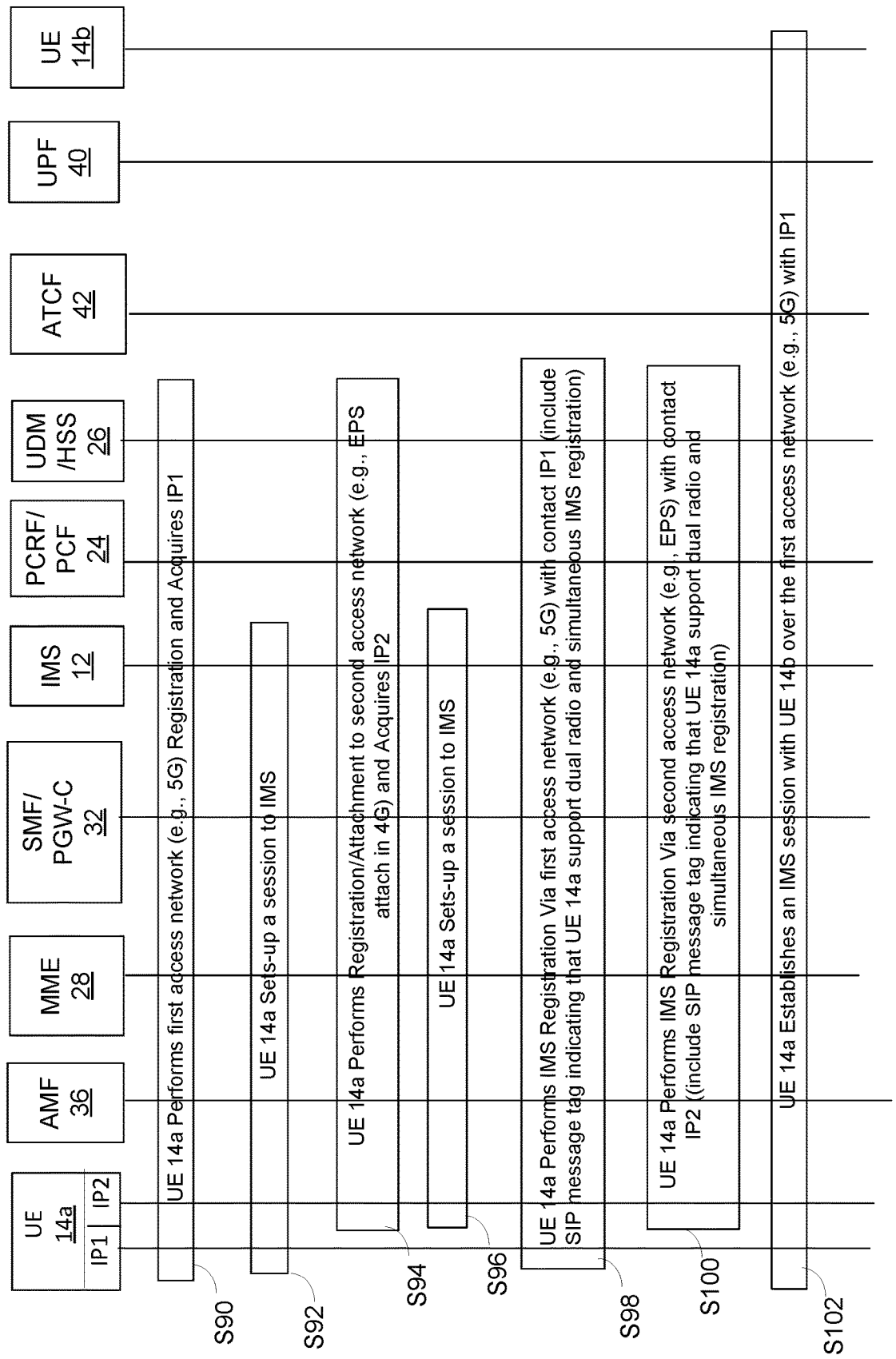
FIG. 9 is a flow diagram illustrating an exemplary method of continuing an ongoing IMS session with dual registration according to one embodiment of the present disclosure.

As shown in FIG. 9a, in one embodiment, the UE 14a performs a registration with the first access network 16 (e.g., 5G) and acquires a first IP address (IP1) (S90). The UE 14a may then set-up a session to IMS 12 that is associated with the first access network 16 (S92). Stated another way, in one embodiment, the UE 14a registers to 5G and establishes a protocol data unit (PDU) session with the IMS Data Network Name, (DNN). The UE 14a may be considered a dual radio UE and may be capable of simultaneous registration with more than one access network. Accordingly, the UE 14a may perform an attachment to the second access network 18 (e.g., 4G) and acquire a second IP address (IP2) (S94). The second IP address may be different from the first IP address. The UE 14a may set-up a session to IMS 12 associated with the second access network 18 (S96). Stated another way, in one embodiment, the UE 14a attaches to 4G Evolved Packet System (EPS) and establishes a Packet Data Network (PDN) connection with IMS well-known Access Point Name (APN). Attachment to the second access network 18 and session set-up may be performed according to known attachment and set-up procedures and techniques. The UE 14a may perform IMS registration via the first access network 16 with contact information corresponding to IP1 and including in, for example, the registration message a SIP message tag indicating that the UE 14a supports dual radio and/or simultaneous IMS registration (S98). The UE 14a may also perform IMS registration via the second access network 18 with contact information corresponding to IP2 and including in, for example, the registration message a SIP message tag indicating that the UE 14a supports dual radio and/or simultaneous IMS registration (S100). The registration message may be, for example, a SIP registration request message sent from the UE 14a to the IMS 12.

SIP registration messages are known; however, embodiments of the present disclosure include a novel tag within the SIP message indicating that the UE 14a supports dual radio and/or is simultaneously registered in IMS, which can be used to prompt elements in the system 10 to perform session continuity according to techniques described herein. The UE 14a may then establish an IMS session via the first access network 16 (e.g., 5G) to a remote UE, such as, UE 14b (S102). Although the exemplary flow diagram shows that the IMS session is initially established over 5G and then switches over to 4G, it should be understood that that, in other embodiments, the IMS session may be established and switched over in the other direction as well (e.g., 4G to 5G) or may involve different IP access networks. Of note, in this exemplary flow diagram the UE 14a is simultaneously registered in IMS over both LTE/4G and 5G using different IP addresses (contact information) associated with the same IMS Private Identity/IMS Public Identity (IMPI/IMPU) pair.

Figure 9B:
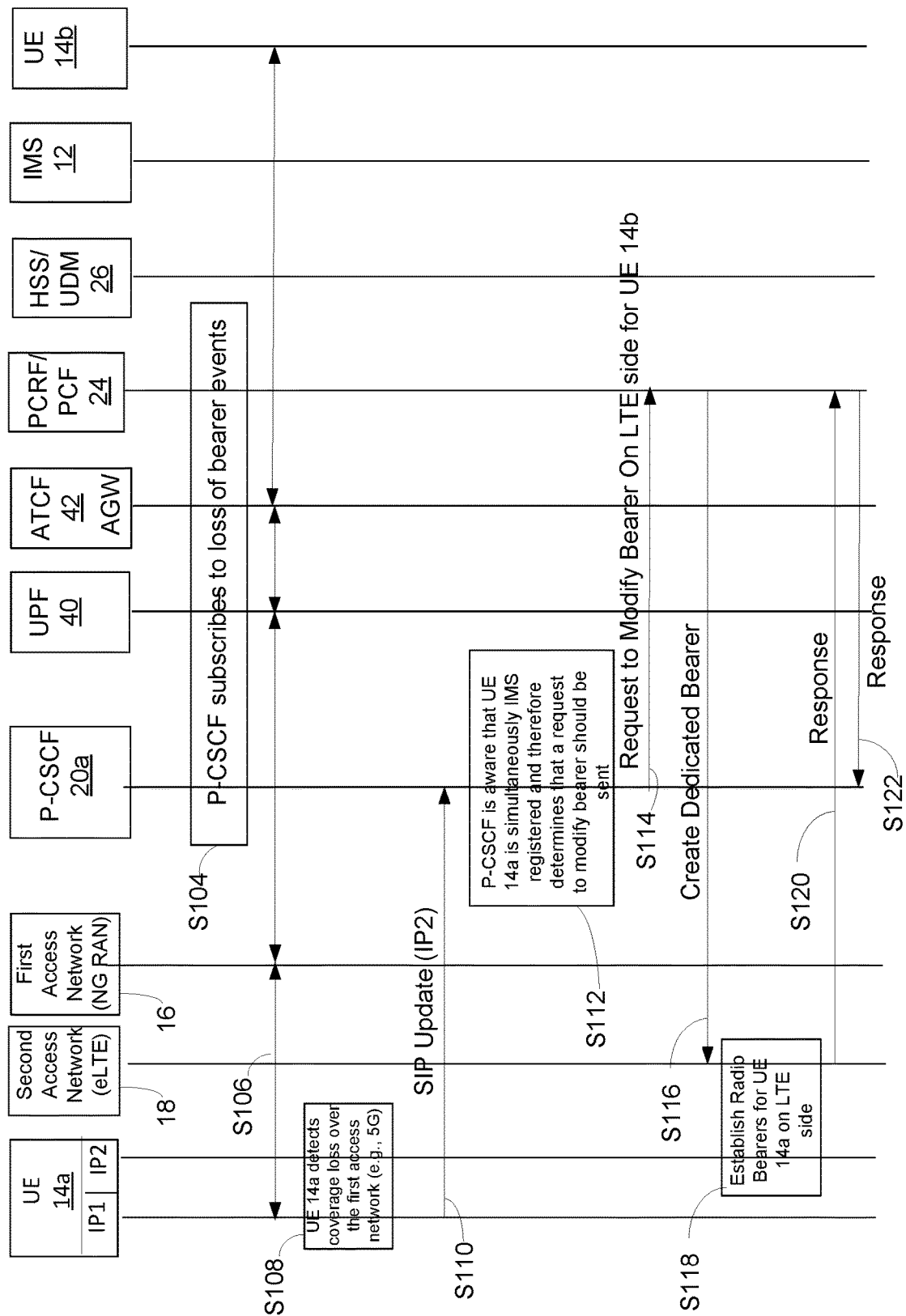

Referring now primarily to FIG. 9b, which is a continuation of the process in FIG. 9a, the P-CSCF 20a subscribes to the loss of bearer event (S104). In one embodiment, the P-CSCF 20a may subscribe to the loss of bearer event at the PCRF server 24. This may be performed during the IMS session set-up procedure. FIG. 9b depicts a single P-CSCF 20a; however, in other embodiments, the handover procedure of the ongoing IMS session from the first access network 16 to the second access network 18 may be handled by a first and a second P-CSCF 20a and 20b. Having established the session and subscribed to loss of bearer event, data may be exchanged between UE 14a and UE 14b during the ongoing IMS session (S106). Before the UE 14a loses coverage, the UE 14a may determine that it is about to lose coverage over the first access network (e.g., 5G) (S108). In one embodiment, the UE 14a may determine that it is about to lose coverage over the first access network by determining that the signal strength has reduced to at least a threshold signal strength and/or the UE 14a may also be notified by the first access network 16 that coverage will be lost. These may be considered indications associated with a loss of bearer event. As a result, the UE 14a may send a SIP UPDATE message with the second IP address (IP2) associated with the second access network 18 (S110).

In one embodiment, the UE 14a may send the SIP UPDATE message with the second IP address to the ATCF 42 via the P-CSCF 20a. The SIP UPDATE message may indicate to the P-CSCF 20a that the UE 14a will lose coverage, and should include at least the second IP address. Other information may also be sent in the SIP UPDATE message such as the session ID, as well as, other information currently included in Single Radio Voice Call Continuity (SRVCC) except in this exemplary case the information may be LTE-related information. The ATCF 42 may be linked in the call at session set-up so as to be included in the SIP signaling path. The ATCF 42 may be used during SRVCC when the UE 14a moves to Circuit Switched (CS) mode to switch media to the second IP address without involving the remote end. In some embodiments, the transition of the IMS session from the first access network 16 to the second access network 18 may be transparent to the remote UE 14b. For example, the UE 14b may not be aware that the address for UE 14a has changed. In some embodiments, this may be because the UE 14b IP packets may terminate in the ATCF 42. The ATCF 42 may be the IMS entity that is aware of and handles the change of address of UE 14a. The ATCF 42 may be responsible for sending or forwarding the IP packets to the updated, second IP address. Thus, the ATCF 42 may be considered to be a bridge between the UE 14a and the UE 14b. The role of the ATCF 42 is defined in TS 23.237. The SIP UPDATE message sent in S110 may be received by the P-CSCF 20a just before the UE loses coverage. The received SIP UPDATE message may enable the P-CSCF 20a to determine that UE 14a is requesting to handover the session to the second access network 18 (e.g., 4G LTE) (S112). In one embodiment, the P-CSCF 20a may determine that UE 14a is requesting to handover the session due to the P-CSCF's 20a knowledge that the UE 14a is dual-registered and by, for example, the UE 14a including at least one indicator in the SIP UPDATE message indicating such request to handover the session to the second access network 18. The P-CSCF 20a, upon recognizing the indicator in the SIP UPDATE message, may initiate a request to the PCRF 24 to set-up a new dedicated bearer towards the second access network 18 for the UE 14a so the handover can occur (S114). In response to the request, the P-CSCF 20a may create the dedicated bearer towards the second access network 18 (S116). Radio bearers for the UE 14a may be established on the second access network 18 (S118). After such radio bearers are established for the UE 14a, the second access network 18 may send a response message to PCRF 24 indicating that the radio bearers are established (S120). Once the setting-up of the dedicated bearer is performed (S116-S120), the PCRF 24 may notify the P-CSCF 20a that new bearers were set-up for the UE 14a via the second access network 18 (S122).

Figure 9C:
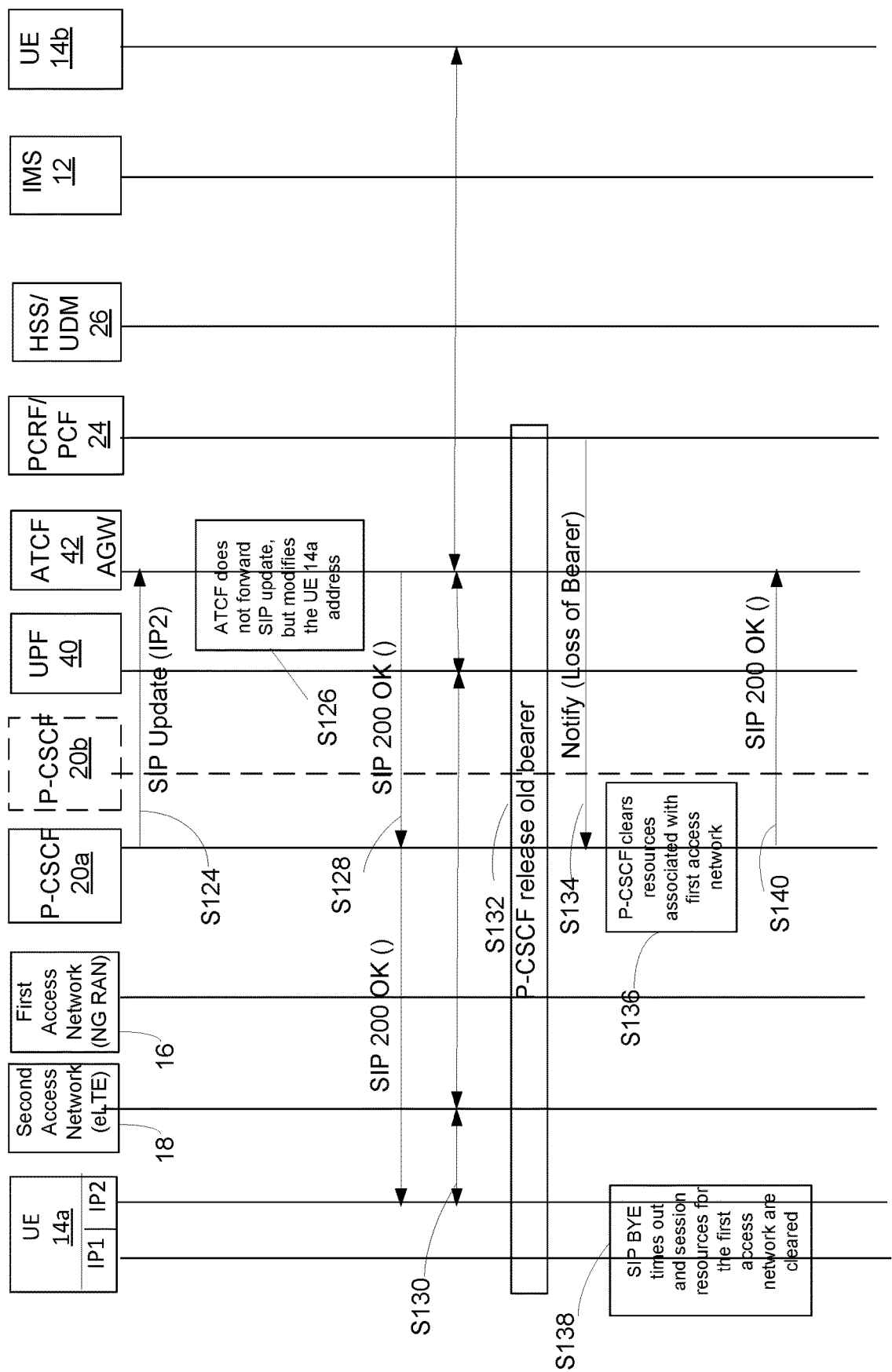

Referring now primarily to FIG. 9c, which is a continuation of the process of FIG. 9b, the exemplary process may continue with the P-CSCF 20a forwarding the SIP UPDATE message to the ATCF 42 (S124). The ATCF 42 may consume this SIP UPDATE message/Request message and switch the media path to the new media path associated with the second IP address and the second access network 18 (S126). In some embodiments, the ATCF 42 does not forward the SIP UPDATE message (e.g., to for example UE 14b), and instead modifies the address associated with the UE 14a within the ATCF 42 (e.g., changes to the second IP address) and then responds to the SIP UPDATE message with a SIP 200 OK towards the UE 14a (S128). Thus, in some embodiments, the change of IP address for UE 14a from the first IP address to the second IP address may be transparent to the remote UE 14b and the call/ongoing IMS session can continue without interruption and without the remote UE 14b even noticing that the handover occurred.

This may be considered an improvement over existing procedures where the ongoing IMS session is interrupted in order to re-register and/or switch IP connectivity to the new IP address. The media path may be changed to a path over the second access network 18 (e.g., LTE and eNB) and the call may continue over the new media path (S130). In an embodiment in which two different P-CSCFs 20a and 20b are used, instead of a single P-CSCF 20a, the initial/old P-CSCF 20a may be configured to not expect to receive a SIP BYE message. This may be due to the registration tag sent at S98 and/or S100 that enables the initial/old P-CSCF 20a to determine that it may not receive a SIP BYE message, and should release its resources for the IMS session. Of note, in some embodiments, a second (new) P-CSCF 20b is not involved. In such embodiments, once the call is actually terminated, the resources are released in the P-CSCF 20a. In some embodiments, the new P-CSCF 20b will only handle any new sessions for UE 14a because the new P-CSCF 20b may not have the session information to handle the continuing session. Therefore, notification of the loss of bearer event may be used to tear down the resources. After the IMS session is successfully handed over to the second access network 18, the P-CSCF 20a removes the old dedicated bearer over the first access network 16 (e.g., NR) associated with the old IP address (S132). The PCRF 24 may send a loss of bearer notification to the P-CSCF 20a (S134). In some embodiments, the P-CSCF 20a may rely on this notification from the PCRF 24 to tear down the session resources associated with the first access network 16. The P-CSCF 20a may clear the resources associated with the first access network (S136). Clearing these resources may include informing the S-CSCF serving the UE 14a and remote UE 14b that the session is torn down using normal SIP procedures. In some embodiments, the P-CSCF 20a will also clear the remote end (e.g., remote UE 14b). In some embodiments, the P-CSCF 20a may clear such resources responsive to receiving the loss of bearer event notification, in addition to knowledge that the UE 14a is dual-registered. In some embodiments, the P-CSCF 20a should not rely solely on the dual-registration knowledge to clear resources; otherwise the P-CSCF 20a could prematurely terminate the call. The notification of S134 may also enable the P-CSCF 20a to determine the exact time that such resources for the first access network 16 are cleared. In other embodiments, the P-CSCF 20a could optionally release the resources after the handover is successfully completed if accounting information is not required to be maintained. At the UE 14a, the SIP BYE message may time out and session resources for the first access network may be cleared (S138). The P-CSCF 20a may then send a SIP 200 Ok message to the PCRF 24 (S140).

In some embodiments, the UE 14a may be configured to handle the session state to associate the ongoing IMS session with the second access network 18 instead of the first access network 16. In one embodiment, the UE 14a may perform this by, for example, creating a transition IMS session state to handle these types of sessions and to distinguish them from a conventional IMS session state. A session typically has several states, which are specified in e.g., Internet Engineering Task Force (IETF) Request for Comments (RFC) 3261, showing the states that a session goes through until it reaches the session established state. In the established state, the UEs 14a and 14b are communicating/exchanging data. This transition IMS session state may be considered a new state provided for the transition from the established state to a handover transition state during a handover procedure performed according to embodiments of the present disclosure. Once the handover is successfully completed, then the session may transition back to established state. In some embodiments, the state machine data will change. For example, the IP address should be changed to the second IP address and other information such as the access network used for the session may also be changed to indicate the second access network 18. In some embodiments, to further support the handover, the UE 14a will be double booked for QoS during the handover period. In other words, during the handover period, the UE 14a will have at least two different QoS parameters for the different access networks 16, 18. In such embodiments, a special indicator, such as a handover indicator, may be included in the request in S114 to the PCRF 24 in order to enable the PCRF 24 to proceed with the setting up the dedicated bearer for the second access network 18 and double-booking the QoS for each of the access networks 16, 18 during at least a portion of the handover period. In other words, the handover indicator in the request message from the P-CSCF 20 to the PCRF 24 (discussed with reference to S114) may allow the PCRF 24 to enable the UE 14a to be simultaneously associated with at least one QoS parameter for the first dedicated bearer associated with the first access network 16 and at least one QoS parameter for the second dedicated bearer associated with the second access network 18.

As will be appreciated by one of skill in the art, the concepts described herein may be embodied as a method, data processing system, and/or computer program product. Accordingly, the concepts described herein may take the form of an entirely hardware embodiment, an entirely software embodiment or an embodiment combining software and hardware aspects all generally referred to herein as a "circuit" or "module." Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks. It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A Proxy-Call Session Control Function (P-CSCF) server for continuing an ongoing Internet Protocol (IP) Multimedia Subsystem (IMS) session when the ongoing IMS session experiences a loss of bearer event, the P-CSCF server comprising processing circuitry having a processor and a memory, the memory containing instructions executable by the processor to configure the P-CSCF server to:
obtain, from a user equipment (UE) an indication that the UE is at least dual-registered with an IMS via at least a first access network and a second access network;
during the ongoing IMS session involving the UE, receive an indication associated with the loss of bearer event for a first dedicated bearer for the ongoing IMS session, the first dedicated bearer is associated with the first access network;
receive a session initiation protocol (SIP) UPDATE message from the UE indicating that the UE will lose coverage over the first access network, wherein the SIP UPDATE message comprises at least one indicator indicating a request to handover the IMS session to the second access network; and
as a result of at least the indication that the UE is at least dual-registered and receiving the indication associated with the loss of bearer event for the first dedicated bearer,
communicate a request to establish a second dedicated bearer for the second access network to continue the ongoing IMS session with the second access network;
establish the second dedicated bearer for the second access network based on response received for the communicated request;
receive notification about establishment of the second dedicated bearer via a Policy and Charging Rules Function (PCRF) server,
wherein the request to establish the second dedicated bearer for the second access network includes at least a handover indicator, the handover indicator indicating that, during at least a portion of a handover period from the first dedicated bearer to the second dedicated bear associated with the ongoing IMS session, the UE is simultaneously associated with at least one Quality of Service (QoS) parameter for the first dedicated bearer associated with the first access network and at least one QoS parameter for the second dedicated bearer associated with the second access network.

2. The P-CSCF server according to claim 1, wherein the processing circuitry is further configured to recognize, based on the indication, that the UE is registered with the IMS using a first IP address associated with the first access network and that the UE is simultaneously registered with the IMS using a second IP address associated with the second access network, the first IP address is different from the second IP address.

3. The P-CSCF server according to claim 2, wherein the processing circuitry is configured to communicate the request to establish the second dedicated bearer for the second access network is further configured to:
during the ongoing IMS session involving at least the UE and responsive to receiving the indication associated with the loss of bearer event for the first dedicated bearer, communicate, to a Policy and Charging Rules Function (PCRF) server, the request to establish the second dedicated bearer for the second access network to continue the ongoing IMS session with IP connectivity via the second access network.

4. The P-CSCF server according to claim 2, wherein the request to establish the second dedicated bearer for the second access network includes at least a handover indicator, the handover indicator indicating that, during at least a portion of a handover period from the first dedicated bearer to the second dedicated bear associated with the ongoing IMS session, the UE is to be simultaneously associated with at least one Quality of Service (QoS) parameter for the first dedicated bearer associated with the first access network and at least one QoS parameter for the second dedicated bearer associated with the second access network.

5. The P-CSCF server according to claim 2, wherein the indication that the UE is at least dual-registered with the IMS includes a session initiation protocol (SIP) message tag communicated from the UE during an IMS registration procedure.

6. The P-CSCF server according to claim 2, wherein the processing circuitry is configured to receive the indication associated with the loss of bearer event for the first dedicated bearer is further configured to receive a session initiation protocol (SIP) UPDATE message from the UE indicating that the UE will lose coverage over the first access network.

7. The P-CSCF server according to claim 1, wherein the processing circuitry is configured to communicate the request to establish the second dedicated bearer for the second access network is further configured to:
during the ongoing IMS session involving at least the UE and responsive to receiving the indication associated with the loss of bearer event for the first dedicated bearer, communicate, to the PCRF server, the request to establish the second dedicated bearer for the second access network to continue the ongoing IMS session with IP connectivity via the second access network.

8. The P-CSCF server according to claim 1, wherein the indication that the UE is at least dual-registered with the IMS includes a session initiation protocol (SIP) message tag communicated from the UE during an IMS registration procedure.

9. The P-CSCF server according to claim 1, wherein the SIP UPDATE message includes at least an IP address associated with IMS registration of the UE via the second access network, the IP address is different from an IP address associated with IMS registration of the UE via the first access network.

10. The P-CSCF server according to claim 1, wherein the processing circuitry is further configured to, during the ongoing IMS session and as a result of at least the indication that the UE is at least dual-registered, release resources associated with IP connectivity via the first access network without expecting to receive a session initiation protocol (SIP) BYE message.

11. A Policy and Charging Rules Function (PCRF) server supporting an ongoing Internet Protocol (IP) Multimedia Subsystem (IMS) session with a user equipment (UE), the PCRF server comprising processing circuitry configured to:
receive, from at least one Proxy-Call Session Control Function (P-CSCF) server, a subscription to a loss of bearer event for the IMS session involving the UE; and
after establishing a first dedicated bearer via a first access network for the IMS session, receive, from the at least one P-CSCF server, a request to establish a second dedicated bearer for the ongoing IMS session, the second dedicated bearer associated with a second access network, wherein the received request to establish the second dedicated bearer for the ongoing IMS session includes at least a handover indicator;
receive a response message from the second access network indicating that the second dedicated bearer is established;
notify the at least one P-CSCF server that the second dedicated bearer is established for the second access network; and
as a result of the handover indicator and during at least a portion of a handover period of the ongoing IMS session from the first access network to the second access network, enable the UE to be simultaneously associated with at least one Quality of Service (QoS) parameter for the first dedicated bearer associated with the first access network and at least one QoS parameter for the second dedicated bearer associated with the second access network.

12. The PCRF server according to claim 11, wherein the processing circuitry is further configured to:
responsive to the request to establish the second dedicated bearer for the ongoing IMS session, establish the second dedicated bearer for the ongoing IMS session via the second access network.

* * * * *